United States Patent
Kuwano et al.

[11] 3,891,236
[45] June 24, 1975

[54] SHOCK ABSORBER FOR BICYCLES

[75] Inventors: Nobuyori Kuwano; Yasutomo Tajima, both of Gyoda, Japan

[73] Assignee: Showa Manufacturing Co., Inc., Tokyo, Japan

[22] Filed: Jan. 24, 1973

[21] Appl. No.: 326,468

[30] Foreign Application Priority Data
Aug. 31, 1972 Japan.................................. 47-87399

[52] U.S. Cl. ................ 280/283; 188/317; 267/132
[51] Int. Cl. ............................................ B62k 21/14
[58] Field of Search .............. 280/283; 267/34, 132; 188/282, 316, 317

[56] References Cited
UNITED STATES PATENTS

| 642,606 | 2/1900 | Haider | 280/283 |
| 880,257 | 2/1908 | Welch | 188/316 |
| 979,483 | 12/1910 | Harley | 280/283 |
| 2,989,299 | 6/1961 | Modrich | 188/282 |
| 3,425,522 | 2/1969 | Gryglas | 188/282 |

FOREIGN PATENTS OR APPLICATIONS

| 583,604 | 12/1946 | United Kingdom | 280/283 |
| 209,067 | 5/1956 | Australia | 267/34 |

Primary Examiner—Albert J. Makay
Assistant Examiner—Ross Weaver
Attorney, Agent, or Firm—A. W. Breiner

[57] ABSTRACT

This invention relates to a shock absorber which can be easily fitted to a conventional bicycle. The absorber riding comfort by providing damping force, is very simply adjustable to the spring load in accordance with the weight of rider and is light in weight.

2 Claims, 3 Drawing Figures

PATENTED JUN 24 1975

3,891,236

SHOCK ABSORBER FOR BICYCLES

This invention relates to a shock absorber for improving the riding comfort of a bicycle.

In a bicycle, the weight of the rider is distributed dividedly to the saddle and handle the same as in an autobicycle. Therefore, the riding comfort can be improved by equipping the bicycle with a shock absorber. However, shock absorbers for an autobicycle are complicated in structure, rather expensive and rather heavy in weight so that they are unsuitable for a bicycle.

An object of the present invention is to provide a shock absorber for bicycles which is very neat in shape; rather light in weight; has a simple structure and can be easily fitted to an existing bicycle.

Figure 1:
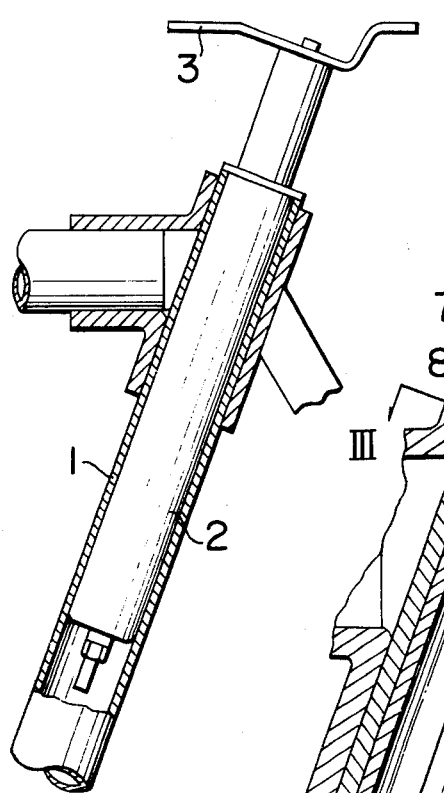
FIG. 1 is a vertically sectioned side view of a part of a frame equipped with a shock absorber in the bicycle saddle according to the present invention.

In the present invention, a shock absorber 2 is fitted in a pipe 1 in a frame of a bicycle and a saddle or a handle is fixed to the upper end of the shock absorber 2. FIG. 1 shows a saddle base 3. The shock absorber 2 is fitted inside of a vertical pipe 1 as in FIG. 2, an oil cylinder 5 is fitted slidably but nonrotatably in a bottomed cylinder 4 fixed to said vertical pipe 1, an O-ring 7 is loosely fitted to a piston 6 slidably fitted in said cylinder and an oil hole 8 which passes from the O-ring groove to one end surface of the piston is provided. Further, a piston rod 11 is extended through a rod guide 9 and oil seal 10 provided in the open end part of the cylinder 5 and is fastened at the threaded end to the bottom surface of the cylinder 4 and a suspension spring 12 is stretched between the bottom surface of the cylinder 4 and the cylinder 5. Further, the above mentioned saddle base 3 is welded to the upper end of the oil cylinder 5, a screw 14 is screwed in a hole for feeding oil 13, a nut 15 is fixed to the bottom surface of the cylinder 4, the piston rod 11 is screwed in said nut and a fastening nut 16 is screwed on said rod. Therefore, the position of fastening the piston rod 11 to the bottom surface of the cylinder 4, that is, the spring set load can be adjusted by the rotation of the above mentioned rod 11. Further, as shown in FIG. 3, the outside surface of the oil cylinder 5 and the inside surface of the cylinder 4 are formed to be a polygon pillar to prevent their relative rotation.

Figure 2:
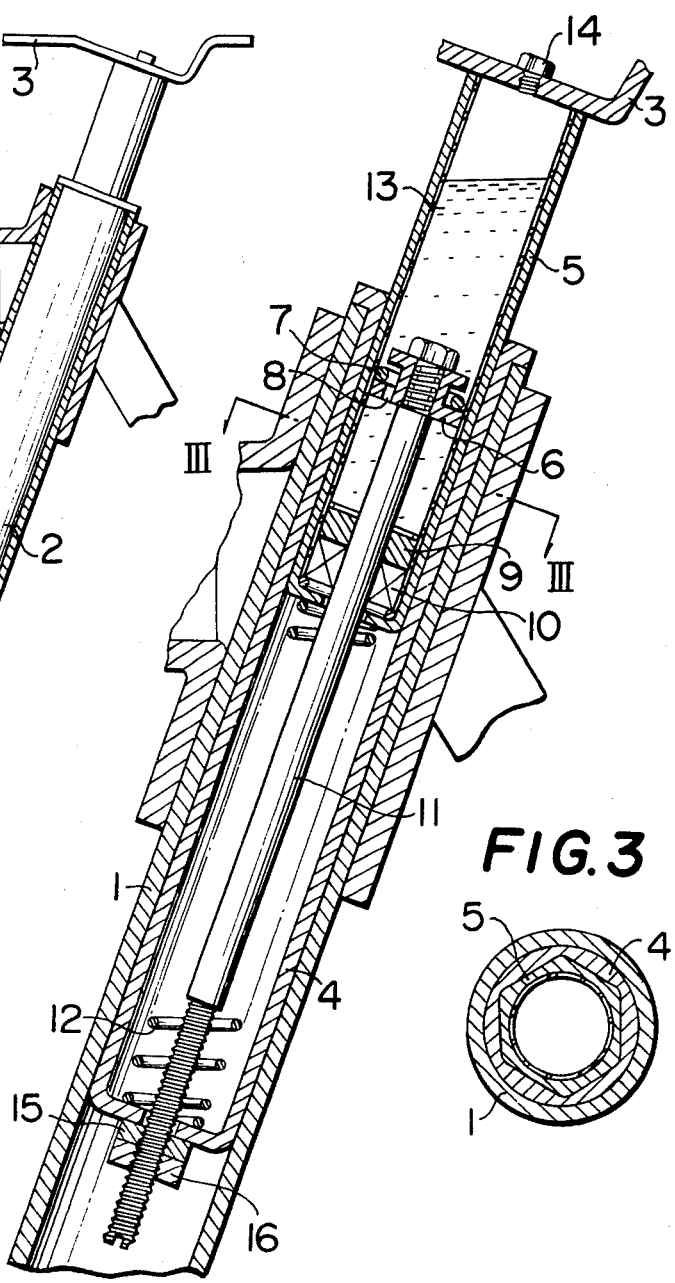
FIG. 2 is a vertically sectioned side view of the shock absorber of FIG. 1.
Figure 3:
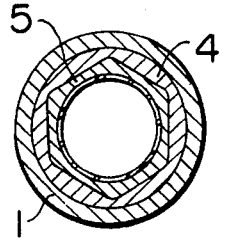
FIG. 3 is a sectioned view on line III — III of FIG. 2.

In the above described device, normally the cylinder 5 will be pushed by the spring 12 so that the rod guide 9 may remain substantially in close contact with the piston 6 but, when a person rides on the bicycle, the spring 12 will be compressed by his load so as to be in the state shown in FIG. 2. Therefore, in this state, the position of the piston 6 is changed in response to the weight of the rider so that the piston 6 may be positioned substantially in the middle part of the cylinder 5. This adjustment can be easily made by pulling the shock absorber 2 out of the vertical pipe 1 and rotating the piston rod 11. Further, in the case of compression movement, the O-ring 7 will be pushed against the lower part of the groove of the piston and therefore the oil 13 above the piston 6 will easily flow down through the hole 8 so that the damping force may be of a very small value. But, in the case of rebound motion, the O-ring 7 will move to the upper part of the groove to close the gap on the peripheral edge of the piston so that a large dumping force may be generated to prevent the vibration.

In the above described device, the saddle is fixed to the shock absorber 2. However, this shock absorber can be also fitted into the head pipe of the frame and the handle can be fixed to the upper end of the shock absorber. Thus the shock absorber of the present invention can be easily equipped by being only fitted into the frame pipe of a bicycle, therefore it is not necessary to change the structure of a conventional bicycle in fitting it and an existing bicycle can be easily equipped with this shock absorber. As the riding comfort is remarkably improved by the provision of a damping force and the spring is integrally contained, the spring structure of the saddle itself can be eliminated so that the saddle may be simple. Further, as the spring set load can be easily adjusted to conform to the body weight, the shock absorber operates always in a favorable condition. The structure is simple to fit and can be formed to be light in weight. By forming the outside surface of the oil cylinder and the inside surface of the cylinder to be polygonal, the rotation of the saddle or handle can be consequently prevented. In the above described device, the damping action is generated by hydraulic resistance. However, there can be also used a friction damper in which a damping force is generated by a friction between a piston and the inside surface of a cylinder without oil in it.

What is claimed is:

1. In combination, a bicycle and a shock absorber comprising a bottom cylinder having a circular outside surface and a polygonal inside surface fitted into the upper end of a pipe forming part of the frame of said bicycle, an oil cylinder having a polygonal outside surface mated to said polygonal inside surface of said bottom cylinder and a circular inside surface fitted slidably but nonrotatably in said bottom cylinder by virtue of said mated polygonal surfaces of said bottom and oil cylinders and connected at its upper end to a passenger-engaging element of said bicycle, piston means coacting with said bottom cylinder and said oil cylinder, damping means provided on said piston means to generate a damping force in said oil cylinder, spring load means stretched between the bottom surface of said bottom cylinder and the oil cylinder, adjustable fastening means fitted to said piston means at its lower end and cooperating with a mating portion at the bottom surface of said bottom cylinder so that the spring set load is adjustable.

2. The combination of claim 1 wherein said damping means comprises an O-ring groove provided in said piston means, an O-ring loosely fitted in said groove and an oil hole passing from said O-ring groove to one end surface of said piston means.

* * * * *